May 11, 1965 G. M. SOMMER 3,182,776
CLUTCH-BRAKE UNIT
Filed April 30, 1962 5 Sheets-Sheet 1

Fig.1

INVENTOR.
Gordon M. Sommer,
BY
Cromwell, Greist + Warden
attys.

Fig. 2

INVENTOR.
Gordon M. Sommer,
BY
Cromwell, Greist & Warden
attys.

May 11, 1965

G. M. SOMMER 3,182,776

CLUTCH-BRAKE UNIT

Filed April 30, 1962

INVENTOR.
Gordon M. Sommer,
BY
Cromwell, Greist & Warden
ATTYS

May 11, 1965 G. M. SOMMER 3,182,776
CLUTCH-BRAKE UNIT
Filed April 30, 1962 5 Sheets-Sheet 4

INVENTOR.
Gordon M Sommer
BY
Cromwell, Greist + Warden
Attys 3,182,776
CLUTCH-BRAKE UNIT
Gordon M. Sommer, New Castle, Ind., assignor to Force Control, Inc., New Castle, Ind., a corporation of Indiana
Filed Apr. 30, 1962, Ser. No. 191,128
6 Claims. (Cl. 192—18)

The present invention relates to a combination clutch-brake unit and, more particularly, to a low inertia, oil-submerged clutch-brake unit.

An important object of the present invention is to provide a new and improved clutch-brake unit wherein the clutch is air operated and the brake is spring operated whereby the holding power of the brake, which is very important as a safety feature, is not affected by electrical or air circuit failures.

Another important object of the present invention is to provide a new and improved clutch-brake unit of the character described wherein the clutch and brake are mechanically interlocked whereby when the clutch is engaged the brake is automatically disengaged and when the clutch is disengaged the brake is automatically engaged, which arrangement provides not only a safety feature but also precludes damage that could occur if there were no mechanical interlock between the clutch and brake.

Another important object of the present invention is to provide a new and improved clutch-brake unit of the character described wherein the air cylinder and the drive lugs or keys for the rotatable clutch plates are integral parts of the input shaft and wherein the non-rotatable brake plates are keyed directly to integral parts of the housing.

Another important object of the present invention is to provide a new and improved clutch-brake unit of the character described wherein the rotatable elements within the housing are low inertia elements whereby to provide increased efficiency and effectiveness of operation of the unit.

Another important object of the present invention is to provide a new and improved clutch-brake unit of the character described wherein the friction plates are rotatable in a bath of oil in a sealed housing whereby 90% of the kinetic energy transmitted in starting and stopping heavy loads is transmitted by "shearing" the oil between the various friction plates, thus substantially increasing the life of such friction plates over those in clutch and brake units which operate dry.

A still further important object of the present invention is to provide a new and improved clutch-brake unit of the character described wherein the inner configuration of the sealed housing is non-cylindrical whereby to provide sufficient agitation of the oil so that it will most effectively get into the friction plate linings rather than merely circulating statically in a smooth generally cylindrical current flow with the rotatable parts.

Further important objects of the present invention are to provide a new and improved clutch-brake unit of the character described which is simple and compact in design, economical to produce and operate, extremely rugged and maintenance-free during operation, and wherein the input and output shafts are readily adaptable for direct mounting thereon of any type machine member such as fly wheels, gears, sheaves, couplings, sprockets, etc.

While the foregoing statements are indicative in a general way of the nature of the invention, other more specific objects and advantages will be apparent to those skilled in the art upon a full understanding of the construction, arrangement and function of the several parts which have been combined to form the clutch-brake unit.

A preferred embodiment of the invention is presented herein, but it will, of course, be appreciated that the invention is susceptible of incorporation in other forms coming equally within the scope of the appended claims.

In the accompanying drawings:

FIG. 14 is an edge view of the thrust plate of FIG. 13;

Figure 1:
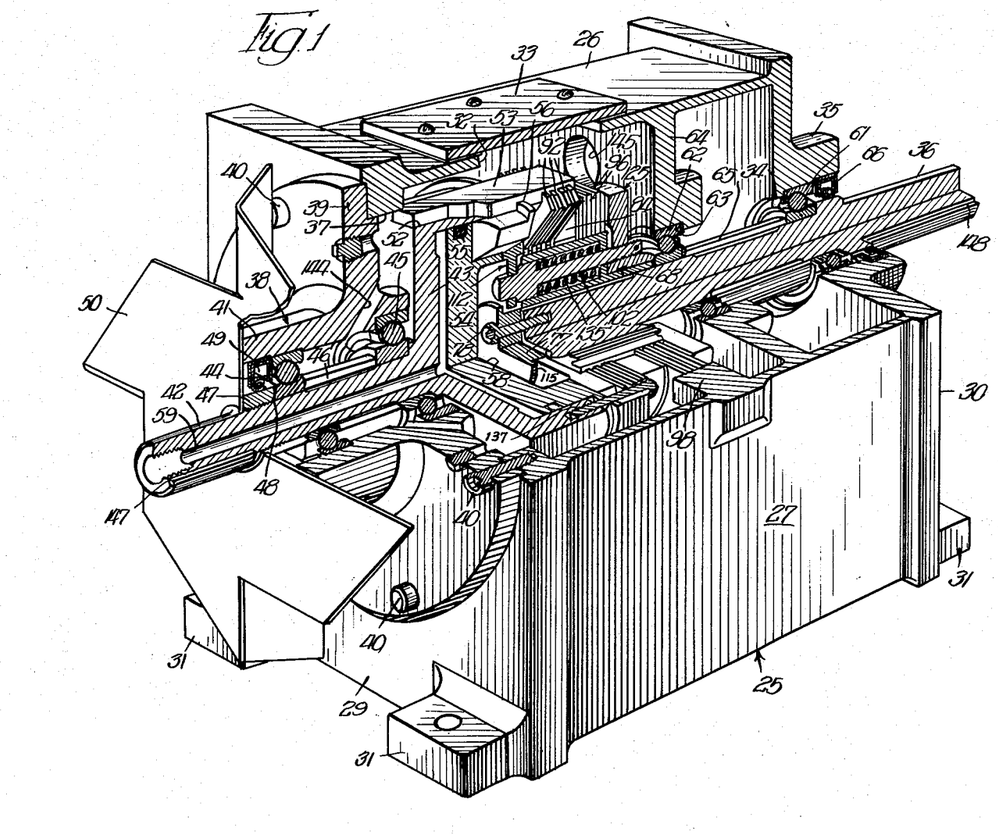
FIG. 1 is a perspective view of a preferred embodiment of the clutch-brake unit of the invention with a segmental portion cut away.
Figure 2:
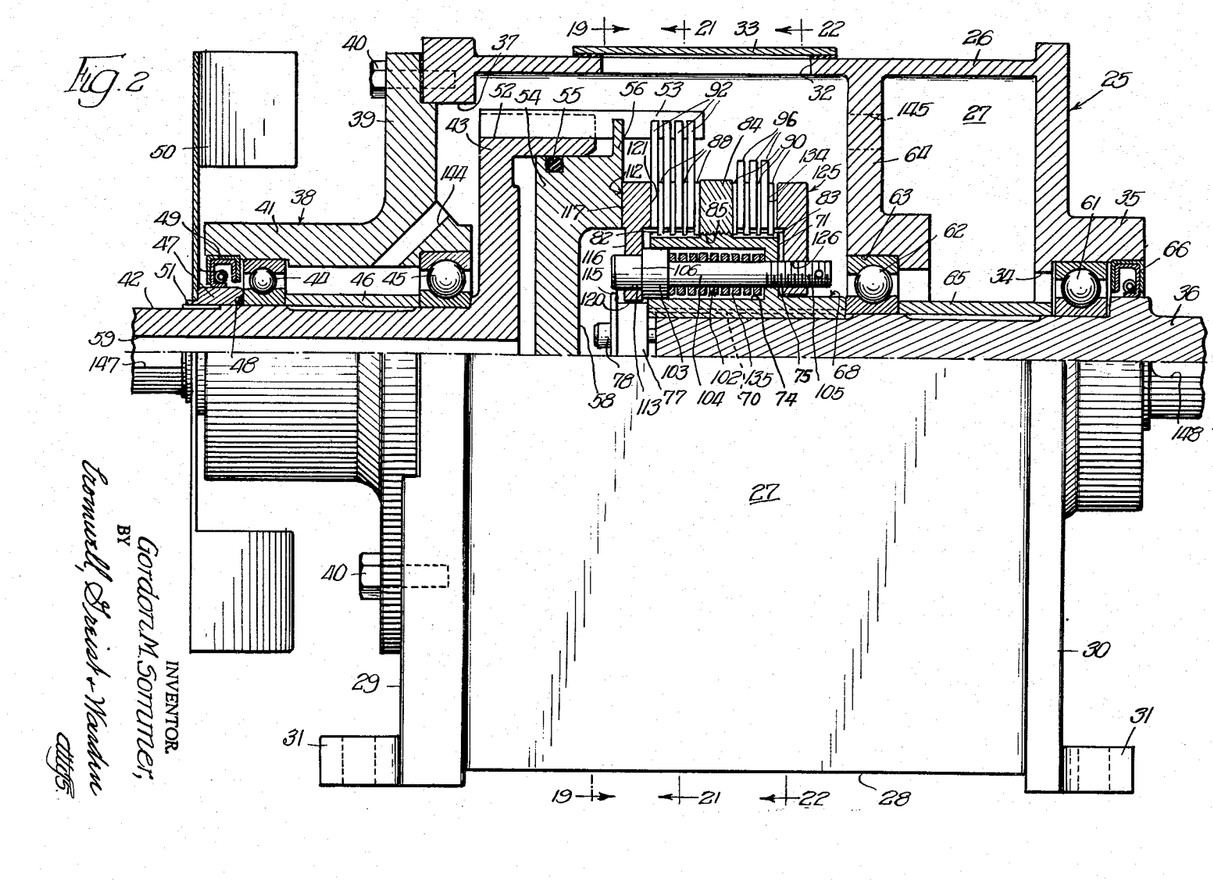
FIG. 2 is a side elevational view of the clutch-brake unit of FIG. 1 with the portion thereof above the center line of the aligned input and output shafts being shown generally in central vertical section.

As best illustrated in FIGS. 1 and 2, the embodiment of the clutch-brake unit illustrated in the drawings includes a generally rectangular housing 25 which is characterized by a top wall 26, side walls 27, a bottom wall 28, and end walls 29 and 30 whereby to provide a housing having a non-cylindrical inner surface for a purpose to be set forth hereinafter. The housing 25 is provided with a plurality of feet 31 having bores formed therein for mounting the unit on a suitable supporting structure in any one of a number of desired positions. The top wall 26 is provided with an opening 32 which is normally closed by a removable cover plate 33 and the end wall 30 is provided with an opening 34 including an outwardly projecting annular flange portion 35 through which an output shaft 36 extends. The end wall 29 is provided with a substantially larger opening 37 than the opening 34 in the end wall 30 with the center lines of the two openings 37 and 34 being co-linear. The opening 37 in the end wall 29 is closed by an end housing 38 which is characterized by a plate portion 39 which is bolted to the end wall 29 by suitable fasteners 40 and by an outwardly projecting tubular portion 41.

Figures 3, 4:
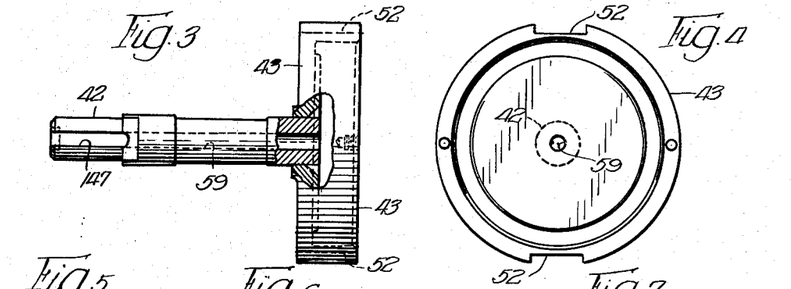
FIG. 3 is a reduced scale side elevational view, partly in vertical section, of the input shaft having the air cylinder formed on the inner end thereof.
FIG. 4 is a right end view of the combination input shaft and air cylinder shown in FIG. 3.

An input shaft 42, FIGS. 3 and 4, extends through the tubular portion 41 of the end housing 38 in axial alignment with the output shaft 36 and has an open-ended air cylinder 43 of substantial diameter formed on its inner end and disposed inwardly of the end wall 29 with the open end of the cylinder 43 opening toward the end wall 30. The input shaft 42 is rotatably mounted in the tubular portion 41 of the end housing 38 by a pair of anti-friction bearings 44 and 45 of known type which are spaced apart by a sleeve-like spacer 46 disposed therebetween. A collar 47 is threadedly secured on the input shaft 42 outwardly of the bearing 44 and an O-ring 48 is provided therebetween. An annular oil seal 49 of known type is provided between the outer surface of the collar 47 and a portion of the bore of the tubular portion 41 of the end housing 38. A fan blade 50 is preferably secured on a reduced-in-diameter flange portion 51 of the collar 47 which projects outwardly of the outer end of the end housing 38 for the purpose of circulating air past the housing 25.

Figure 5:
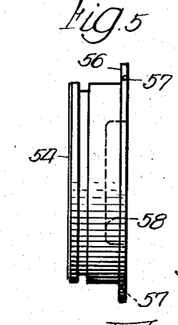
FIG. 5 is a side elevational view of the piston for the air cylinder of FIGS. 3 and 4.
Figure 6:
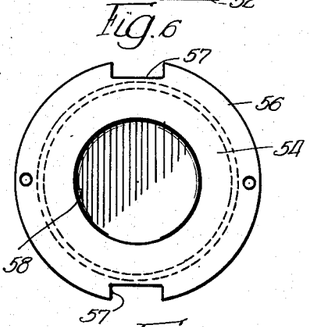
FIG. 6 is a right end view of the piston of FIG. 5.

The outer surface of the cylinder 43 formed on the inner end of the input shaft 42 is provided with a pair of diametrically opposite longitudinally extending keyways 52 in which are permanently mounted a pair of drive lugs or keys 53 which extend inwardly of the housing 25 from the cylinder 43 in directions parallel to the axis of rotation thereof. It is to be understood that four or more drive lugs may be provided, if so desired. A piston 54, FIGS. 5 and 6, having an O-ring 55 associated therewith is provided in the cylinder 43 for movement relative thereto in an axial direction. The outer end of the piston 54 is provided with an outwardly directed radial flange portion 56 having a pair of diametrically opposite keyways 57 formed therein to accommodate the drive lugs 53 whereby the piston 54 is rotatable with the cylinder 43 formed on the inner end of the input shaft 42. During operation of the unit, the input shaft 42 is rotated continuously by suitable drive means. The outer face of the piston 54 is centrally recessed, as at 58, for clearance purposes which will be evident hereinafter. In order to direct pressure into the cylinder 43 to shift the piston 54 outwardly thereof, the input shaft 42 is provided with an axially disposed pressure passage 59 which is open at the outer end of the input shaft 42 for connection to a suitable pressure source through a rotary union of known type. Preferably, the piston 54 is air actuated.

The output shaft 36 is rotatably mounted in a pair of anti-friction bearings 61 and 62 with the bearing 61 being mounted in the opening 34 provided in the end wall 30 and the bearing 62 being mounted in an opening 63 formed in an inner vertically disposed transverse wall 64 provided in the housing 25. A sleeve-like spacer 65 is disposed about the output shaft 36 between the bearings 61 and 62. An annular oil seal 66 of known type is provided outwardly of the bearing 61 between an outer surface portion of the output shaft 36 and a portion of the bore of the annular flange portion 35 of the end plate 30.

Figure 9:
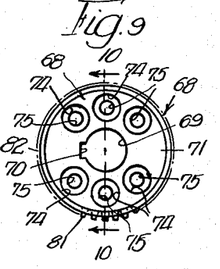
FIG. 9 is a reduced scale left end view of the drive hub as shown in FIG. 2.
Figure 10:
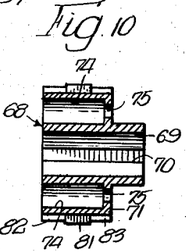
FIG. 10 is a vertical section taken generally on the line 10—10 of FIG. 9.

As best illustrated in FIG. 2, a drive hub 68 is keyed on the innermost end of the output shaft 36 in a manner well known in the art. As illustrated in FIGS. 9 and 10, the drive hub 68, which is generally cylindrical in shape, is provided with a central bore 69 having a keyway 70 for keyed engagement thereof on the inner end of the output shaft 36. A portion 71 of the drive hub 68 of substantial length, at the left end thereof, as viewed in FIGS. 2 and 10, is substantially increased in diameter and is provided with a series of six circumferentially spaced bores 74, the right ends of which are reduced in diameter, as at 75 in FIGS. 2 and 10. The drive hub 68 is retained on the inner end of the output shaft 36 with its right end, as viewed in FIG. 2, disposed against the bearing 62 by a retainer plate 77 which abuts against the left end thereof, as viewed in FIG. 2, and is secured to the inner end face of the output shaft 36 by a pair of fasteners 78.

Figure 15:
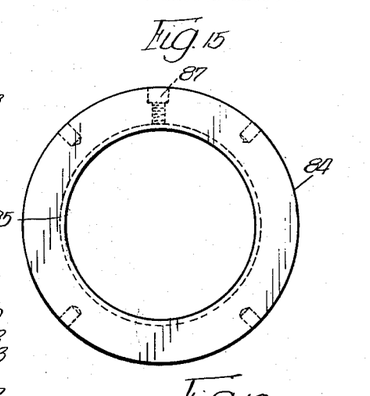
FIG. 15 is a reduced scale face view of the center plate shown in FIG. 2.
Figure 23:
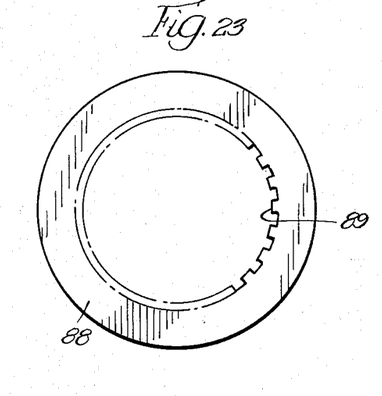
FIG. 23 is a reduced scale face view of one of the clutch friction discs.

The outer surface of the enlarged diameter portion 71 of the drive hub 68 is provided substantially midway between its opposite ends with an external thread formation 81 with the remaining portions of the outer surface on each side of the thread formation 81 being provided with external spline formations 82 and 83. A center plate 84, FIGS. 15 and 16, having a threaded internal bore 85 is threadedly mounted on the enlarged diameter portion 71 of the drive hub 68 in threaded engagement with the external thread formation 81 thereof. The center plate 84 may be axially adjusted relative to the drive hub 68, for reasons to be described hereinafter, and is adapted to be secured in an adjusted position on the drive hub 68 in a known manner by a set screw 87. A first series of clutch friction discs 88, FIG. 23, having internal spline formations 89 are splined on the enlarged diameter portion 71 of the drive hub 68 to the left of the center plate 84, as viewed in FIG. 2, in splined engagement with the spline formation 82 thereon and a second series of discs 90, identical to the discs 88, having internal spline formations 91 are splined on the enlarged diameter portion 71 of the drive hub 68 to the right of the center plate 84, as viewed in FIG. 2, in splined engagement with the spline formation 83 thereon.

Figure 7:
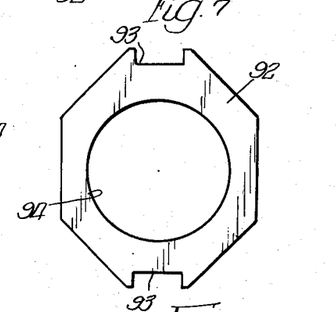
FIG. 7 is a reduced scale face view of one of the rotatable clutch plate members as positioned in FIGS. 1 and 2.
Figure 8:
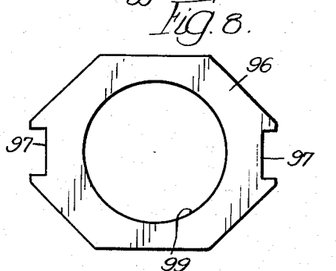
FIG. 8 is a face view of one of the non-rotatable brake plate members as mounted in the housing in FIGS. 1 and 2.
Figure 22:
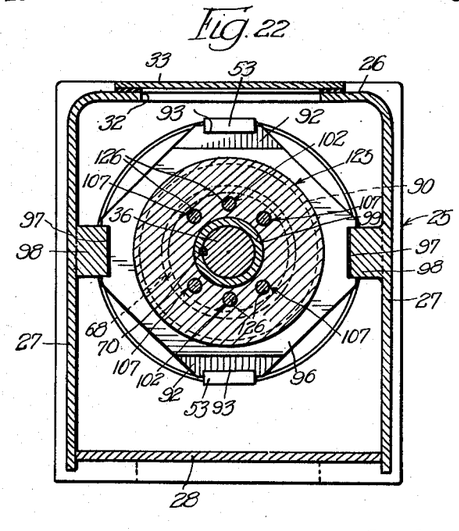
FIG. 22 is a reduced scale vertical section taken generally on the line 22—22 of FIG. 2.

A series of friction clutch plate members 92, FIG. 7, of generally octagonal peripheral configuration are each provided with a pair of diametrically opposite key notches 93 for keyed engagement with the pair of drive lugs 53 secured to the air cylinder 43 whereby the clutch plate members 92 are rotatable therewith and shiftable relative thereto in an axial direction. The clutch plate members 92 are centrally bored, as at 94, with the inner peripheral edges thereof being interposed between the outer peripheral edges of the series of clutch friction discs 88, as best illustrated in FIG. 2. A series of friction brake plate members 96, FIG. 8, of generally octagonal peripheral configuration are each provided with a pair of diametrically opposite key notches 97 for keyed engagement with a pair of lugs 98, FIG. 22, which are integrally formed on the inner surfaces of the two side walls 27 of the housing 25 whereby the brake plate members 96 are non-rotatably mounted in the housing 25 but are shiftable relative thereto in an axial direction. The brake plate members 96 are each centraly bored, as at 99, with the inner peripheral edges thereof being interposed between the outer peripheral edges of the series of brake friction discs 90, as best illustrated in FIG. 2.

Figure 11:
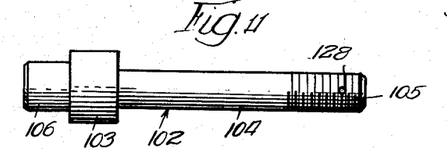
FIG. 11 is an enlarged scale side elevational view of the drive rod shown in FIG. 2.
Figure 12:
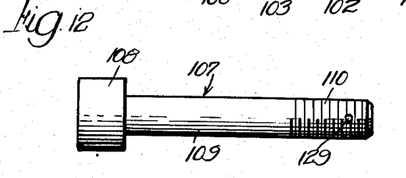
FIG. 12 is an enlarged scale side elevational view of one of the spacer rods.

Mechanical interlock means are provided for either simultaneously compressing the clutch plates 92 and the clutch friction discs 88 together and relieving the frictional engagement between the brake plates 96 and the brake friction discs 90 or for simultaneously relieving the frictional engagement between the clutch plates 92 and the clutch friction discs 88 and compressing the brake plates 96 and the brake friction discs 90 together, whereby to provide a highly efficient and effective clutch-brake unit. For this purpose, a pair of drive rods 102, FIG. 11, are provided in a diametrically opposite pair of the bores 74 provided in the drive hub 68. Each drive rod is characterized by a collar portion 103 which is slidable in the bore 74, a reduced-in-diameter shank portion 104 which extends to the right therefrom, as viewed in FIGS. 2 and 11, through the reduced-in-diameter bore portion 75 and has a threaded end 105, and by a reduced-in-diameter head portion 106 which extends to the left of the collar portion 103, as viewed in FIGS. 2 and 11. The remaining bores 74 are provided with spacer rods 107, FIG. 12, each of which is characterized by a collar portion 108 which is slidable in the bore 74, and a reduced-in-diameter shank portion 109 which extends to the right therefrom, as viewed in FIG. 12, through the reduced-in-diameter bore portion 75 and has a threaded end 110. Except for the absence of the reduced-in-diameter head portions 106, the spaced rods 107 are identical to the drive rods 102.

Figures 12, 13:
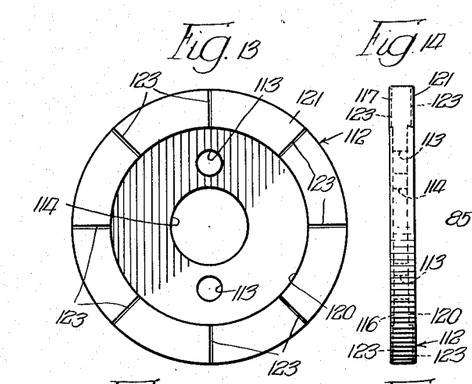
FIG. 13 is a reduced scale left end view of the thrust plate as shown in FIG. 2.

A thrust plate 112, FIGS. 13 and 14, is provided with a pair of diametrically opposite bores 113 for receiving the reduced-in-diameter heads 106 of the pair of drive rods 102 whereby to mount the thrust plate 112 thereon for rotation with the drive hub 68. The thrust plate 112 is provided with a central bore 114 through which the retainer plate 77 extends with a radial flange 115 on the retainer plate 77 being adapted to prevent inadvertent removal of the thrust plate 112 from the reduced-in-diameter heads 106 of the two drive rods 102. The face of the thrust plate 112 adjacent the piston 54 is provided with a central recess 116 whereby to define outwardly thereof an annular bearing surface 117 which is adapted for engagement by the non-recessed portion of the outer face of the piston 54. The face of the thrust plate 112 directed away from the piston 54 is also provided with a central recess 120 whereby to define an annular bearing surface 121 outwardly thereof which is adapted to be slidably shifted into abutting engagement with the clutch plate member 92 furthest from the center plate 84 upon outward movement of the piston 54 as a result of air pressure being directed into the cylinder 43, thus compressing the clutch plate members 92 and the clutch friction discs 88 together against the center plate 84 to engage the clutch and transmit the rotation of the input shaft 42 and clutch plates 92 to the output shaft 36 through the clutch friction discs 88 and the drive hub 68. This axial movement of the thrust plate 112 away from the cylinder 43 to engage the clutch is also transmitted to the drive rods 102 and the spacer rods 107 as a result of the engagement of the thrust plate 112 with the collar portions 103 and 108 of the drive rods 102 and the spacer rods 107, respectively, whereby to shift the drive rods 102 and the spacer rods 107 to the right, as viewed in FIG. 2, relative to the drive hub 68. The two annular bearing surfaces 117 and 121 of the thrust plate 112, which may be formed of phosphor bronze, for example, are each provided with a series of eight radially extending grooves 123 which are equidistantly spaced apart circumferentially thereabout and have a width of approximately one-eighth of an inch and a depth of approximately one/thirty-second of an inch.

Figures 16, 17:
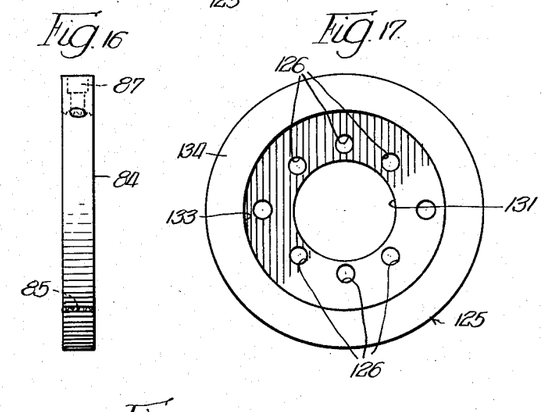
FIG. 16 is an edge view of the center plate of FIG. 15.
FIG. 17 is a reduced scale left end view of the end plate as shown in FIG. 2.
Figure 18:
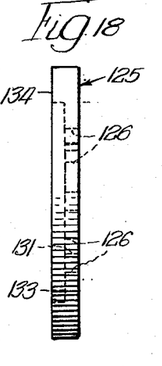
FIG. 18 is an edge view of the end plate of FIG. 17.

An end plate 125, FIGS. 17 and 18, is provided with a series of six circumferentially arranged threaded bores 126 which are adapted to receive the threaded end portions 105 and 110 of the drive rods 102 and the spacer rods 107, respectively, whereby the end plate 125 is securely mounted thereon. Radial through bores 128 and 129 may be provided in the outer ends of the threaded end portions 105 and 110 of the drive rods 102 and the spacer rods 107, respectively, to receive known type locking wires or locking pins. The end plate 125 is provided with a central bore 131 through which the non-enlarged diameter portion of the drive hub 68 extends. The face of the end plate 125 directed toward the center plate 84 is provided with a central recess 133 whereby to define outwardly thereof an annular bearing surface 134 which when the end plate 125 is moved toward the center plate 84 compresses the brake plate members 96 and the brake friction discs 90 together against the center plate 84 whereby to engage the brake and prevent rotation of the output shaft 36. When the end plate 125 is moved away from the center plate 84 due to axial movement of the drive rods 102 and spacer rods 107 as a result of actuation of the piston 54 to engage the clutch, as previously described herein, the friction brake discs 90 are released from frictional engagement with the non-rotatable brake plate members 96 whereby to release the brake simultaneously as the clutch is engaged.

A series of six springs 135, which may be generally rectangular in cross section, are provided one in each of the bores 74 of the drive hub 68 about the shanks 104 and 109, respectively, of the drive rods 102 and the spacer rods 107. The springs 135 bear against the enlarged collars 103 and 108, respectively, of the drive rods 102 and the spacer rods 107 whereby to normally urge these rod members and thus the thrust and end plates 112 and 125, respectively, to the left, as viewed in FIG. 2, with the thrust plate 112 being urged in a direction to release the clutch and the end plate 125 being urged in a direction to engage the brake. The foregoing condition exists, however, only when no pressure is directed into the cylinder 43.

In the embodiment of the clutch-brake unit shown in the drawings and as best illustrated in FIG. 2, the torque transmitting portion of the clutch is characterized by an alternate arrangement of four clutch plates 92 and four clutch friction discs 88 with one of the clutch plates 92 being disposed adjacent the thrust plate 112 and with one of the clutch friction discs 88 being disposed adjacent one face of the center plate 84. The torque transmitting portion of the brake is characterized by an alternate arrangement of three brake plates 96 and four brake friction discs 90 with one of the brake friction discs 90 being disposed adjacent the end plate 125 and with another one of the brake friction discs 90 being disposed adjacent the other face of the center plate 84.

During operation of the unit, when it is desirable to engage the clutch, pressure is admitted to the cylinder 43 whereby to shift the piston 54 outwardly thereof. This outward movement of the piston 54 performs two functions simultaneously. The thrust plate 112, as a result of the axial movement imparted thereto by the piston 54, compresses the clutch plates 92 and the clutch friction discs 88 together against the center plate 84 whereby to transmit the torque of the input shaft 42 to the output shaft 36. The foregoing axial movement of the thrust plate 112 simultaneously shifts the drive rods 102 and the spacer rods 107 to the right, as viewed in FIG. 2, whereby to shift end plate 125 away from the center plate 84 and thus release the brake, as described herein, to permit free rotation of the output shaft 36 with the input shaft 42. As soon as pressure is relieved from the cylinder 43, the springs 135 become operable to shift the drive rods 102 and the spacer rods 107 and thus the thrust plate 112 and the end plate 125 to the left, as viewed in FIG. 2, whereby to simultaneously disengage the clutch and engage the brake, as described herein.

Figures 19, 21:
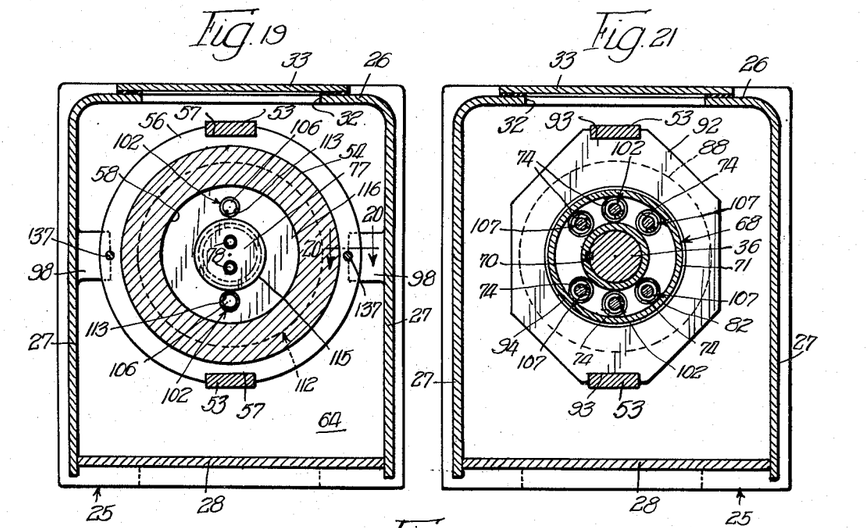
FIG. 19 is a reduced scale vertical section taken generally on the line 19—19 of FIG. 2.
FIG. 21 is a reduced scale vertical section taken generally on the line 21—21 of FIG. 2.
Figure 20:
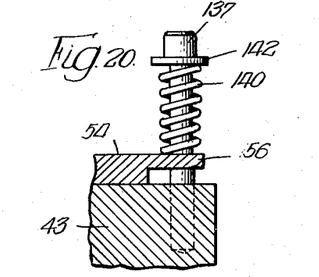
FIG. 20 is an enlarged scale fragmentary horizontal section taken generally on the line 20—20 of FIG. 19 illustrating the auxiliary spring arrangement for urging the piston inwardly of the cylinder.

When pressure is relieved from the cylinder 43 to disengage the clutch and engage the brake as described, provision is made for shifting the continuously rotatable piston 54 inwardly of the cylinder 43 and away from the thrust plate 112 which is held stationary as a result of the brake being engaged whereby to prevent any dragging action between the outer face of the piston 54 and the bearing surface 117 of the thrust plate 112. As best illustrated in FIGS. 1, 19 and 20, a pair of diametrically opposite piston return spring rods 137 are mounted in the end surface of the cylinder 43 which is directed toward the end wall 30 of the housing in a manner such that the rods 137 extend away therefrom. The radial flange portion 56 of the piston 54 is provided with a pair of diametrically opposite bores through which the rods 137 freely extend and relatively lightweight spring members 140 are disposed about the shanks of the rods 137 and are seated between the outer surface of the radial flange portion 56 of the piston 54 and washer-like members 142 mounted on the free or outer ends of the rods 137 whereby the spring members 140 normally urge the piston 54 inwardly of the cylinder 43. The foregoing piston return arrangement also aids in exhausting air from the cylinder 43 when the pressure is relieved.

In the foregoing clutch-brake unit, the low inertia torque transmitting elements within the housing 25 are rotatable in a bath of oil in the sealed housing 25 whereby 90% of the kinetic energy transmitted in starting and stopping heavy loads is transmitted by "shearing" the oil between the various friction plates, thus substantially increasing not only the life of these friction plates over those in clutch and brake units which operate dry but also the maximum operating speed of the unit. Conventional air friction clutches and air brakes are usually limited to a maximum operating speed of between 200 and 400 r.p.m. whereas the foregoing oil submerged unit can usually be operated up to 1200 r.p.m. on the most severe applications. The non-cylindrical inner configuration of the housing 25 is adapted to provide sufficient agitation and breaking up of the oil so that it will most effectively get between the various friction plates rather than merely circulating statically in a smooth generally cylindrical current flow with the rotatable elements. In order to insure that sufficient oil is provided for the bearings 44, 45, 61 and 62, the end housing 38 is provided with a series of passages 144 and the transverse inner wall 64 is provided with a series of openings 145. Suitable plugged openings may be provided in the housing 25 for filling the housing with oil to a predetermined level and for checking the oil level.

Normally, it is only necessary that the center plate 84 be adjusted on the drive hub 68 for proper friction plate clearance during the initial assembly of this clutch-brake unit.

It is noted that the input shaft 42 is provided with a keyway 147 and the output shaft 36 is provided with a keyway 148 whereby to permit direct mounting of any type machine member thereon such as fly wheels, gears, sheaves, couplings, sprockets, etc.

I claim:

1. A clutch-brake unit comprising, in combination a housing, axially aligned input and output shafts mounted in said housing, a hydraulic cylinder and piston provided on the inner end of said input shaft for rotation therewith, said cylinder and piston being concentric with said input shaft and being non-rotatably connected with each other, a series of radially disposed clutch plates mounted on said cylinder for rotation therewith, a series of radially disposed brake plates spaced from said clutch plates in an axial direction and non-rotatably attached to said housing, a series of friction discs mounted on the inner end of said output shaft for rotation therewith and adapted for selective frictional engagement with said clutch and brake plates, a pair of axially spaced plate members carried on the inner end of said output shaft one on either end of said friction discs, means extending between said pair of plate members and operably engageable therewith in a manner such that said pair of plate members are movable together axially of said output shaft with movement thereof in one direction serving simultaneously to frictionally engage said clutch plates with certain of said friction discs and to release the remaining friction discs from frictional engagement with said brake plates and with movement thereof in the other direction serving simultaneously to release said clutch plates from said frictional engagement with said certain friction discs and to frictionally engage said remaining friction discs with said brake plates, and spring means normally urging said axially spaced plate members in said other direction to engage the brake and release the clutch, said plate members being movable in said one direction to engage the clutch and release the brake on actuation of said hydraulic cylinder and piston with one of said plate members being positively engaged and shifted by said piston.

2. A clutch-brake unit comprising, in combination, a housing, axially aligned input and output shafts mounted in said housing, an open-ended air cylinder formed on the inner end of said input shaft and having a piston provided therein, said cylinder and piston being concentric with said input shaft and being non-rotatably connected with each other, spring means operably connected between said cylinder and said piston for normally urging said piston inwardly of said cylinder, a pair of diametrically opposite drive keys secured on the outer circumference of said cylinder and extending away therefrom inwardly of said housing in parallel relationship to the axis of rotation of said input shaft, a series of radially disposed clutch plates keyed to said drive keys for rotation therewith and for sliding movement in an axial direction relative thereto, a series of radially disposed brake plates spaced from said clutch plates in an axial direction and non-rotatably attached to said housing, a series of friction discs mounted on the inner end of said output shaft for rotation therewith and adapted for selective frictional engagement with said clutch and brake plates, a pair of axially spaced plate members carried on the inner end of said output shaft one on either end of said friction discs, means extending between said pair of plate members and operably engageable therewith in a manner such that said plate members are movable together axially of said output shaft with movement thereof in one direction serving simultaneously to frictionally engage said clutch plates with certain of said friction discs and to release the remaining friction discs from frictional engagement with said brake plates and with movement thereof in the other direction serving simultaneously to release said clutch plates from said frictional engagement with said certain friction discs and to frictionally engage said remaining friction discs with said brake plates, and spring means normally urging said axially spaced plate members in said other direction to engage the brake and release the clutch, said plate members being movable in said one direction to engage the clutch and release the brake upon actuation of said hydraulic cylinder and piston with one of said plate members being positively engaged and shifted by said piston.

3. A clutch-brake unit comprising, in combination, a housing, an input shaft having an open-ended cylinder formed concentrically on its inner end, an output shaft in axial alignment with said input shaft, a piston in said cylinder, a drive hub mounted on the inner end of said output shaft and having a series of radially extending clutch friction discs keyed on the innermost end thereof and a series of radially extending brake friction discs keyed on the opposite end thereof, a center plate mounted on the drive hub between said two series of friction discs, a series of radially disposed clutch plates interposed between said series of clutch friction discs, said clutch plates being mounted on said cylinder for rotation therewith, a series of radially disposed brake plates interposed between said series of brake friction discs, said brake plates being non-rotatably keyed to said housing, a plurality of circumferentially spaced longitudinally extending rod members mounted in said drive hub for movement relative thereto in an axial direction, an end plate secured on the ends of said rod members at the end of said drive hub furthest from said cylinder and disposed closely adjacent to the brake friction disc farthest from said center plate whereby axial movement of said end plate toward said cylinder serves to compress said brake plates and brake friction discs together against said center plate to engage the brake and whereby axial movement thereof away from said cylinder serves to disengage said brake plates and brake friction discs to release the brake, a thrust plate mounted on the opposite ends of at least two of said rod members and disposed between said piston and the clutch plate furthest from said center plate whereby axial movement of said thrust plate away from said cylinder serves to compress said clutch plates and said clutch friction discs together against said center plate to engage the clutch and whereby axial movement thereof toward said cylinder serves to release said clutch plates and clutch friction discs to disengage the clutch, the face of said thrust plate directed away from said piston being disposed against enlarged collar portions of said rod members whereby axial movement of said thrust plate away from said cylinder in response to pressure actuation of said piston is operable to engage the clutch and simultaneously through the resulting axial movement of said rod members and said end plate to release the brake, and spring means associated with each of said rod members for normally urging same and thus said thrust and end plates toward said cylinder whereby to simultaneously disengage the clutch and engage the brake upon a release of pressure from said cylinder.

4. A clutch-brake unit comprising, in combination, a sealed housing adapted to be filled to a predetermined level with oil, an input shaft extending into said housing and having an open-ended cylinder formed concentrically on its inner end, an output shaft extending into said housing in axial alignment with said input shaft, a piston in said cylinder, a drive hub mounted on the inner end of said output shaft and having a series of radially extending clutch friction discs keyed on the innermost end thereof and a series of radially extending brake friction discs keyed on the opposite end thereof, a center plate mounted on said drive hub between said two series of friction discs, a pair of diametrically opposite drive keys secured on the outer circumference of said cylinder and extending away therefrom inwardly of said housing in parallel relationship to the axis of rotation of said input shaft, a series of radially disposed clutch plates interposed between said series of clutch friction discs, said clutch plates being keyed to said drive keys for rotation therewith, a series of radially disposed brake plates interposed between said series of brake friction discs, said brake plates being non-rotatably keyed to said housing, a plurality of circumferentially spaced drive rods mounted in longitudinally extending bores formed in said drive hub for movement relative thereto in an axial direction, an end plate secured on the ends of said drive rods at the end of said drive hub furthest from said cylinder and disposed closely adjacent to the brake friction disc furthest from said center plate whereby axial movement of said end plate toward said cylinder serves to compress said brake plates and brake friction discs together against said center plate to engage the brake and whereby axial movement thereof away from said cylinder serves to disengage said brake plates and brake friction discs to release the brake, a thrust plate mounted on opposite ends of at least two of said drive rods and disposed between said piston and the clutch plate furthest from said center plate whereby axial movement of said thrust plate away from said cylinder serves to compress said clutch plates and clutch friction discs together against said center plate to engage the clutch and whereby axial movement thereof toward said cylinder serves to release said clutch plates and clutch friction discs to disengage the clutch, the face of said thrust plate directed away from said piston being disposed against enlarged collar portions of said drive rods, whereby axial movement of said thrust plate away from said cylinder in response to pressure actuation of said piston is operable to engage the clutch and simultaneously through the resulting axial movement of said drive rods and said end plate to release the brake, spring means associated with each of said drive rods for normally urging same and thus said thrust and end plates toward said cylinder whereby to simultaneously disengage the clutch and engage the brake upon a release of pressure from said cylinder, and auxiliary spring means operably connected between said cylinder and said piston for normally urging said piston inwardly of said cylinder whereby upon a release of pressure from said cylinder said piston is urged away from said thrust plate whereby to prevent any drag action therebetween when the clutch is disengaged and the brake is engaged.

5. A clutch-brake unit comprising, in combination, a sealed housing having a non-circular inner surface and adapted to be filled to a predetermined level with oil, an input shaft extending into one end of said housing and having an open-ended air cylinder formed concentrically on its inner end, an output shaft extending into the opposite end of said housing in axial alignment with said input shaft, a piston in said air cylinder and air pressure conduits formed in said input shaft for directing air pressure into said cylinder whereby to shift said piston outwardly of said cylinder, a drive hub mounted on the inner end of said output shaft and having a series of radially extending clutch friction discs keyed on the innermost end thereof and a series of radially extending brake friction discs keyed on the opposite end thereof, a center plate adjustably mounted on said drive hub between said two series of friction discs, a series of radially disposed clutch plates interposed between said series of clutch friction discs, said clutch plates being mounted on said cylinder for rotation therewith and for axial sliding movement relative thereto, a series of radially disposed brake plates interposed between said series of brake friction discs, said brake plates being non-rotatably keyed to lugs formed integrally on the inner surface of said housing for axial movement relative thereto, a plurality of circumferentially spaced drive rods mounted in longitudinally extending bores formed in said drive hub for movement relative thereto in an axial direction, an end plate secured on the ends of said drive rods at the end of said drive hub furthest from said cylinder and disposed closely adjacent to the brake friction disc furthest from said center plate whereby axial movement of said end plate toward said cylinder serves to compress said brake plates and brake friction discs together against said center plate to engage the brake and whereby axial movement thereof away from said cylinder serves to disengage said brake plates and brake friction discs to release the brake, a thrust plate mounted on the opposite ends of at least two of said drive rods and disposed between said piston and the clutch plate furthest from said center plate whereby axial movement of said thrust plate away from said cylinder serves to compress said clutch plates and clutch friction discs together against said center plate to engage the clutch and whereby axial movement thereof toward said cylinder serves to release said clutch plates and clutch friction discs to disengage the clutch, the face of said clutch plate opposite the face adjacent said piston being disposed against enlarged collar portions of said drive rods, whereby axial movement of said thrust plate away from said cylinder in response to pressure actuation of said piston is operable to engage the clutch and simultaneously through the resulting axial movement of said drive rods and said end plate to release the brake, and spring means associated with each of said drive rods for normally urging same and thus said thrust and end plates toward said cylinder whereby to simultaneously disengage the clutch and engage the brake upon a release of pressure from said cylinder.

6. A clutch-brake unit comprising, in combination, a sealed housing having a non-circular inner surface and adapted to be filled with oil to a predetermined level, an input shaft extending into one end of said housing and having an open-ended air cylinder of substantial diameter formed concentrically on its inner end, an output shaft extending into the opposite end of said housing in axial alignment with said input shaft, a piston in said air cylinder and air pressure conduits formed in said input shaft for directing air pressure into said cylinder whereby to shift said piston outwardly of said cylinder, a drive hub mounted on the inner end of said output shaft and having a series of radially extending clutch friction discs keyed on the innermost end thereof and a series of radially extending brake friction discs keyed on the opposite end thereof, a center plate adjustably mounted on said drive hub between said two series of friction discs, a pair of diametrically opposite drive keys secured on the outer circumference of said cylinder and extending away therefrom inwardly of said housing in parallel relationship to the axis of rotation of said input shaft, a series of radially disposed clutch plates interposed between said series of clutch friction discs, said clutch plates being keyed to said drive keys for rotation therewith, a series of radially disposed brake plates interposed between said series of brake friction discs, said brake plates being non-rotatably keyed to lugs formed integrally on the inner surface of said housing, a plurality of circumferentially spaced longitudinally extending drive rods mounted in said drive hub for axial movement relative thereto, an end plate secured on the ends of said drive rods at the end of said drive hub furthest from said cylinder and disposed closely adjacent to the brake friction disc furthest from said center plate whereby axial movement of said end plate toward said cylinder serves to compress said brake plates and brake friction discs together against said center plate to engage the brake and whereby axial movement thereof away from said cylinder serves to disengage said brake plates and brake friction discs to release the brake, a thrust plate mounted on the opposite ends of at least two of said drive rods and disposed between said piston and the clutch plate furthest from said center plate whereby axial movement of said thrust plate away from said cylinder serves to compress said clutch plates and clutch friction discs together against said center plate to engage the clutch and whereby axial movement thereof toward said cylinder serves to release said clutch plates and clutch friction discs to disengage the clutch, the face of said thrust plate directed away from said piston being disposed against enlarged collar portions of said drive rods, whereby axial movement of said thrust plate away from said cylinder in response to pressure actuation of said piston is operable to engage the clutch and simultaneously through the resulting axial movement of said drive rods and said end plate to release the brake, first spring means associated with each of said drive rods for normally urging same and thus said thrust and end plates toward said cylinder whereby to simultaneously disengage the clutch and engage the brake upon a release of pressure from said cylinder, and second spring means operably connected between said cylinder and said piston for normally urging said piston inwardly of said cylinder whereby upon a release of pressure from said cylinder said piston is urged away from said thrust plate whereby to prevent any drag action therebetween when the clutch is disengaged and the brake is engaged.

References Cited by the Examiner
UNITED STATES PATENTS

| 2,441,543 | 5/48 | Longfield | 192—18.1 |
| 2,870,655 | 1/59 | Rockwell | 192—18.1 X |
| 2,998,872 | 9/61 | Sommer et al. | 192—18.1 |
| 3,020,990 | 2/62 | Liu | 192—18.1 X |

DAVID J. WILLIAMOWSKY, *Primary Examiner.*

THOMAS J. HICKEY, *Examiner.*